United States Patent
Galand et al.

[11] Patent Number: 6,157,637
[45] Date of Patent: Dec. 5, 2000

[54] TRANSMISSION SYSTEM OF TELEPHONY CIRCUITS OVER A PACKET SWITCHING NETWORK

[75] Inventors: Claude Galand, Cagnes-sur-Mer; Gerald Lebizay, Vence; Jean Menez, Cagnes-sur-Mer; Gerard Richter, Saint-Jeannet, all of France

[73] Assignee: International Business Machines Corporation, Armonk, N.Y.

[21] Appl. No.: 09/010,004

[22] Filed: Jan. 21, 1998

[30] Foreign Application Priority Data

Sep. 19, 2000 [EP] European Pat. Off. .............. 97480002

[51] Int. Cl.[7] .............................. H04L 12/66; H04J 3/00; H04B 1/66
[52] U.S. Cl. ..................... 370/356; 370/476; 370/477; 375/240; 704/500
[58] Field of Search ..................................... 370/252, 229, 370/230, 232, 235, 395, 352, 356, 470, 471, 474, 477, 476, 254, 521; 704/500, 503; 375/240, 241

[56] References Cited

U.S. PATENT DOCUMENTS

| | | | |
|---|---|---|---|
| 4,890,282 | 12/1989 | Lambert et al. ........................ | 370/477 |
| 5,297,147 | 3/1994 | Shimokasa ............................. | 375/241 |
| 5,721,820 | 2/1998 | Abali et al. ............................. | 709/243 |
| 5,742,930 | 4/1998 | Howitt ................................... | 704/500 |
| 5,912,894 | 6/1999 | Duault et al. .......................... | 370/477 |

*Primary Examiner*—Alpus H. Hsu
*Assistant Examiner*—Afsar M. Qureshi
*Attorney, Agent, or Firm*—Ronald L. Drumheller

[57] ABSTRACT

Process for transmitting compressed voice circuits over a packet switching network of the type comprising a plurality of switching nodes (SW-1 to SW-7) interconnected by connection lines and including at least an end switching node (SW-1) connected to a source exchange telephone device (PABX A) and another end switching node (SW-3) connected to a destination exchange telephone device (CX), and comprising the steps of receiving from the source exchange telephone device a sequence of uncompressed frames wherein each frame contains n slots containing each J bytes respectively associated to J voice circuits, compressing the data bits of each voice circuit in order to build a packet containing J compressed voice circuits, and providing this packet to the end switching node for transmission to the destination exchange telephone device.

8 Claims, 12 Drawing Sheets

| n(j) | n̄(j) | SF(j) |
|---|---|---|
| 8 | 8 | 0000 |
| 7 | 7 | 0001 |
| 6 | 6 | 0010 |
| 5 | 5 | 0011 |
| 8 | 7 | 0100 |
| 7 | 6 | 0101 |
| 6 | 5 | 0110 |
| 5 | 4 | 0111 |
| 0 | 0 | 1000 |

TAB 2

FIG. 13

| M(j) | n(j) |
|---|---|
| 8 | 0 |
| 7 | 8 |
| 6 | 8 |
| 5 | 8 |
| 4 | 8 |
| 3 | 7 |
| 2 | 7 |
| 1 | 6 |
| 0 | 5 |

TAB 1

TRANSMISSION SYSTEM OF TELEPHONY CIRCUITS OVER A PACKET SWITCHING NETWORK

TECHNICAL FIELD

The present invention relates to the transmission of voice signals within a packet switching network, and relates particularly to a system for transmitting telephony circuits in a packet switching network of the ATM type.

BACKGROUND ART

The telecommunication environment is in full evolution and has changed considerably this recent years. The principal reason has been the spectacular progress realized in the communication technology due to the maturing of fiber optical transmission (high speed rates can now be sustained with very low bit error rates) and the universal use of digital technologies within private and public telecommunications networks.

In relation with these new emerging technologies, the offer of the telecommunication companies, public or private, are evolving. Indeed, the emergence of high speed transmissions entails an explosion in the high bandwidth connectivity; the increase of the communication capacity generates more attractive tariffs; a higher flexibility is offered to the users to manage their growth through a wide range of connectivity options, an efficient bandwidth management and the support of new media; and once sampled and digitally encoded, voice, video and image derived data can be merged with pure data for a common and transparent transport.

In a first step, networks were primarily deployed with TDM (Time Division Multiplexing) technology to achieve cost savings through line aggregation. These systems easily supported the fixed bandwidth requirements of host/terminal computing and 64 Kbps PCM (Pulse Code Modulation) voice traffic.

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures—hierarchical versus peer to peer, wide (WAN) versus local (LAN) area networks, voice versus data—the data profile has become higher in bandwidth, bursting, non deterministic and requires more connectivity. Based on the above, it is clear that there is strong requirement to support distributed computing applications across high speed backbones that may be carrying LAN traffic, voice, video, and traffic among channel attached hosts, business workstations, engineering workstations, terminals, and small to intermediate file servers. This traffic reflects a heterogenous mix of: end user network protocols, and real time (steady stream traffic such as voice and video) and non real time (bursty nature traffic such as interactive data) transmissions.

The vision of a high-speed protocol-agile backbone network is the driver for the emergence of fast packet switching network architecture in which data, voice, and video information are digitally encoded, chopped into small packets and transmitted through a common set of nodes and links.

The basic advantage of packet switching techniques compared to circuit switching techniques, is to allow a statistical multiplexing of different types of data over a line (data, voice, image, video), which optimizes the bandwidth. The drawback of packet switching techniques compared to circuit switching techniques, is that it typically introduces an overhead for every packet that is transported. One can reduce such an overhead by using speech compression technique. However, if these techniques apply well to the compression of individual technology circuits, they are not appropriate to the compression of complete telephony trunks between private or public automatic exchanges (PABX) and central exchanges (CX).

For sake of example, the following is a short description of a packet switching system of the type which can be used to implement the invention.

Figure 1:
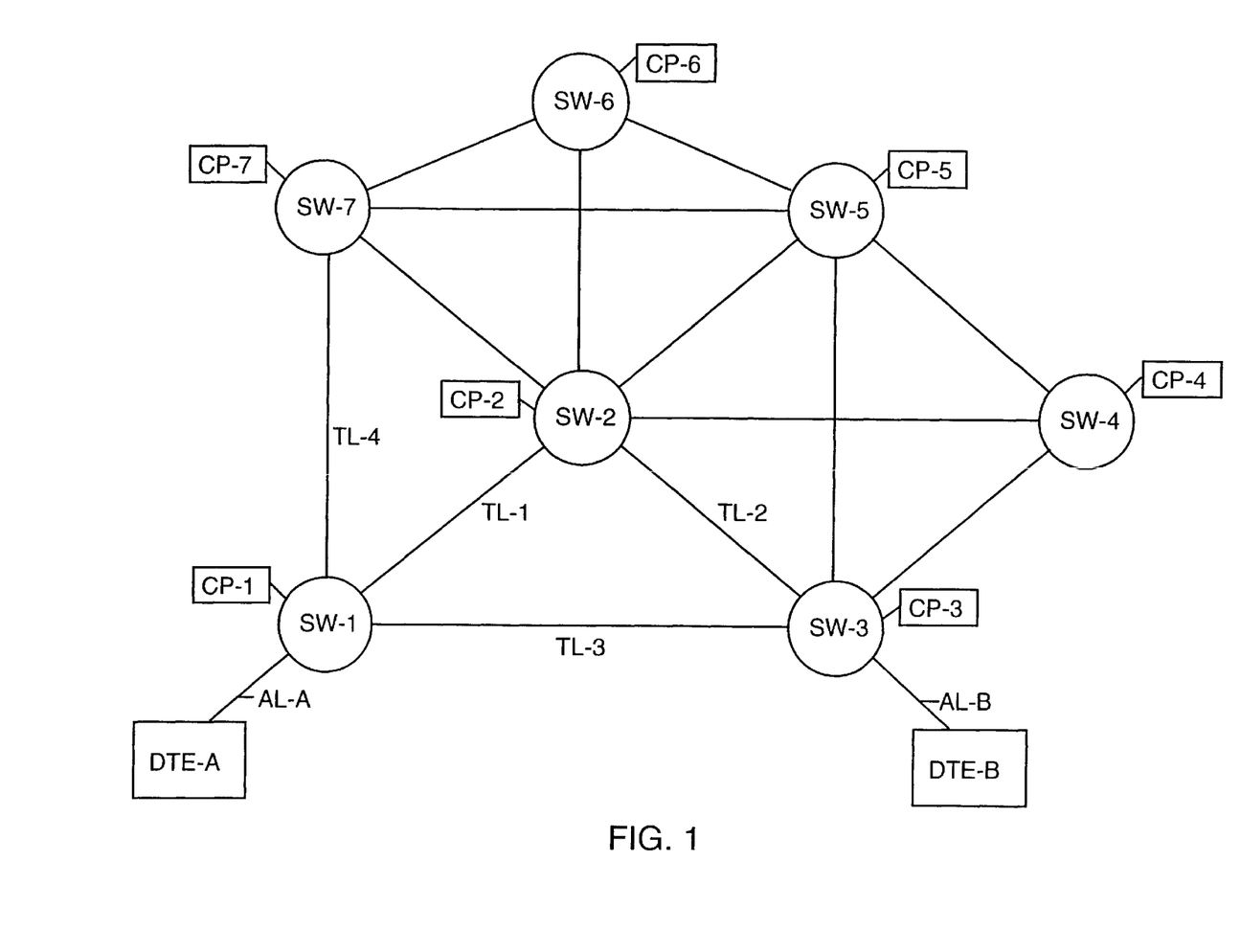
FIG. 1 is a schematic representation of a conventional packet switching network.

FIG. 1 of the drawings represents a packet switching network including 7 switching nodes SW-1 to SW-7 interconnected by trunk lines TL's, and that can be accessed by access lines AL's connected to outside data terminal equipment DTE's.

The network control architecture is a distributed one, which means that each switching node is controlled by a control point CP. All CP's are interconnected via a control point spanning tree switch provides an efficient means for multicasting control messages between the control points. When a CP wants to broadcast a message to other CP's in the network, it sends this message to the switching address of the predefined spanning tree, and the architecture provides the means to route this message on every line of the CP spanning tree, and only on these lines. The architecture also provides the means to initialize the tree address on each switching node, and to automatically re-configure the tree in case of line or switching node failure.

Each CP includes a copy of the Topology data base that contains information about the network. It includes the network physical configuration and the line characteristics and status. For every line n, in the network, the maximum delay T(n) that can be introduced on a packet with a specified priority, and the level of bandwidth reservation R-res(n) of this line are recorded in the Topology Data Base.

This information is distributed to other control points via topology update messages sent over the control point spanning tree whenever it presents significant changes.

User equipment DTE-A and DTE-B are respectively connected to the network via access lines AL-A and AL-B. These equipments are to be interconnected thru the network with a given quality of service (QoS) specified in terms of a maximum delay T_max and a packet loss probability P_loss.

At the switching node SW-1, the control point CP-1 first uses the QoS and the traffic characteristics specified by the user (peak rate, mean rate, average packet length) to compute the amount of bandwidth C_eq, called the equivalent capacity of the connection, to be reserved on every line on the route in order to guarantee a packet loss probability P_l(n) on this line is much smaller than the loss probability P_loss that has been specified for the connection.

Based on the information that is available on a line basis in the Topology Data Base, the control point CP-1 then computes the best route in the network to reach the destination. The Path Selection program first identifies the lines that are eligible for the route. If R(n) and R_res(n) respectively denote the capacity of line n and its current level of reservation, then the line is eligible if:

$$R\_res(n) + C\_eq \leq 0.85\, R(n)$$

it then uses a modified Bellman-Ford algorithm to find the minimum weight, minimum hop count, route from the origin to the destination which uses eligible lines and which satisfies the QoS.

$$T\_max \leq \Sigma T(n)$$

$$P\_loss \leq 1-\Pi(1-P\_l(n))$$

where the summation and product operators are carried over the N lines of the route (n=1, . . . , N).

Let's assume that the chosen route from switches SW-1 to SW-3 uses trunk lines TL-1 and TL-2 via switch SW-2.

Figure 2:
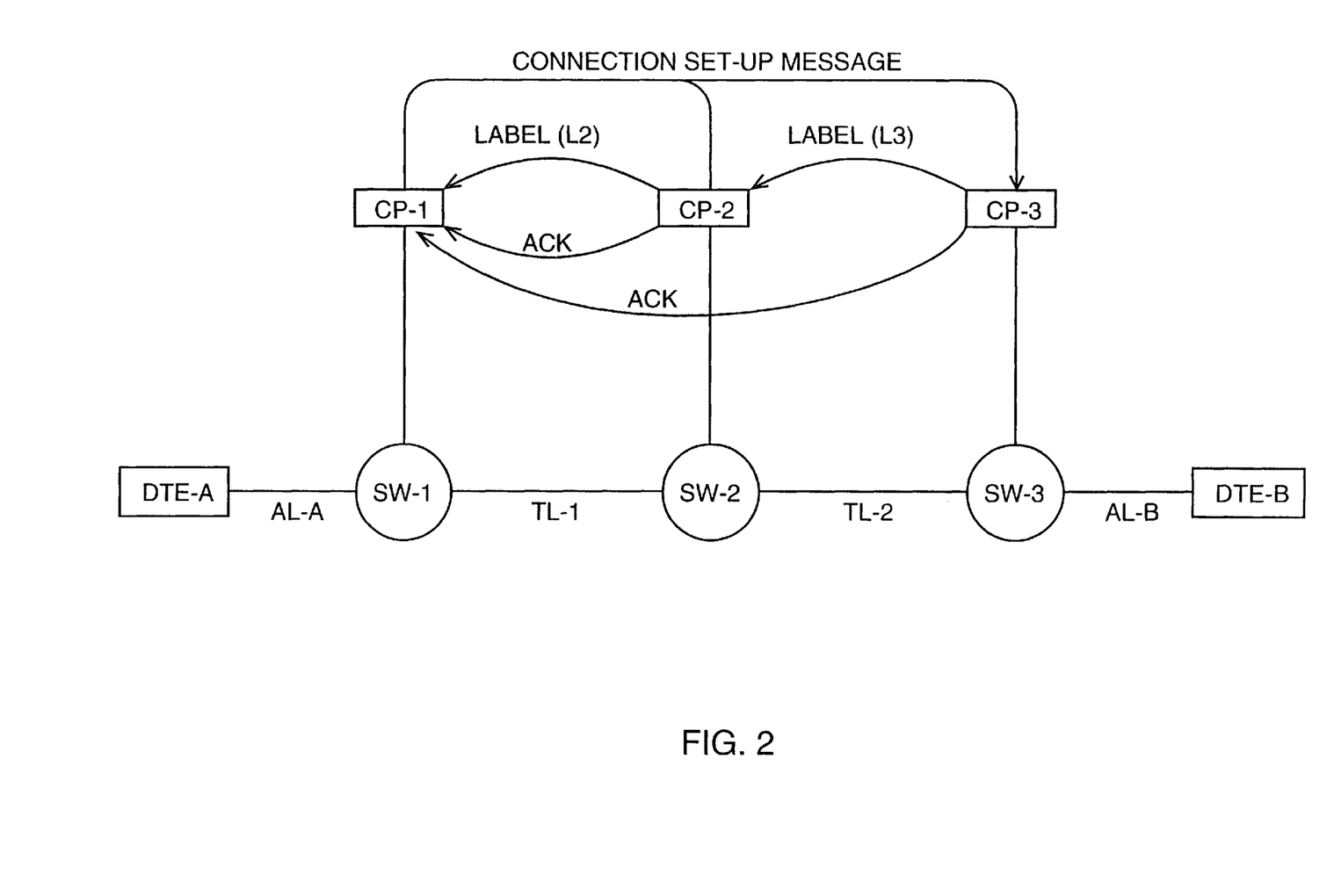
FIG. 2 shows the connection set-up flows in a packet switching network illustrated in FIG. 1.

FIG. 2 shows the message flows between the CP's on the route when a new connection is established. The origin control point CP-1 sends a connection set-up message along the route, a copy of which is delivered to the control point of every switch on the route. This message contains a list of the network addresses of the control points on the route, the list of the line names between these control points, the request bandwidth C_eq, the priority of the connection, and a connection correlator C_cor which is set by the origin CP-1, and which is used by all other CP's to uniquely identify the connection.

Upon reception of the copy of the set-up message, each CP performs two basic tasks.

First, the CP checks whether the equivalent capacity of the new connection is still available on the line to the next switching node on the route, and if it is available, it reserves it. Therefore, the CP checks whether the line is eligible by verifying the first above relation. If it is, the CP reserves the desired amount of bandwidth on the transmit line for the new connection, accepts the connection set-up, increments the reservation level:

$$R\_res(n)=R\_res(n)+C\_eq$$

and if this reservation level has significantly changed, it eventually broadcasts a topology update message on the CP spanning tree to inform the other CP's of the new reservation level R_res of this particular line.

Second, the CP allocates a new label for the new connection, and sends back this label to the control point of the previous switch on the route, for label swapping purpose.

Bandwidth reservations and label allocations are acknowledged from all the CPs on the route, that is CP-2 and CP-3 (see FIG. 2). At the input switch adapter, the data packets that are received from the user equipment DTE-A are appended with a network header which contains the label L2, and with a switch routing header that will be used locally by switch SW-1 to route the packet to the desired transmit adapter for transmission over the line TL-1. At the next switch SW-2, the label L2 of each packet is used to look-up a table which returns the label L3 and a switch routing header. The packet label L2 is swapped for the new label L3, and the packet is forwarded to the appropriate transmit adapter according to the switch routing header for transmission on line TL-2.

At a transmit adapter, the packet is enqueued in one of three possible queues, according to its priority. Three possible traffic priorities are defined, real-time RT, non-real-time (NRT), and non-reserved (NR, or best effort). Typically, the highest priority class RT is used to transport voice or video, the second class NRT is used to transport interactive data, and the third class NR is used for file transfer. Upon request, a scheduler serves the real-time queue with the highest priority and the non-reserved queue with the lowest priority. That means that at every request for a new packet, the scheduler first looks at the real-time queue and serves a real-time packet. If this queue is empty, then the scheduler looks at the non-real-time queue and eventually serves a non-real-time packet. The non-reserved queue is served only when both real-time and non-real-time queues are empty.

The routing operation is repeated until the packet reaches the transmit port adapter of switching node SW-3 where the network header is discarded and the packet is sent to the user equipment DTE-B.

Since it implements bandwidth reservation and priority scheduling at each switching node, the above network architecture allows to transport packets across the network while ensuring a pre-specified quality of service. Thus, the network can carry telephony traffic based upon the RT class of service, interactive data based upon the NRT class of service and batch transfer based upon the NR class of service.

As mentioned above, the advantage of a packets witching network over a circuit switching network is the possibility of optimizing the bandwidth. The drawback is that it introduces an overhead for every packet. When the packet switching is used as a transport network for a telephony network which carries a large number of circuits, classical compression techniques are not convenient because they introduces an added complexity, more delay, and do not ensure the integrity of data.

SUMMARY OF THE INVENTION

Therefore, the main object of the invention is to provide a system for transmitting voice circuits over a packet switching network by using a compression technique which is loss-less and introduces a very few delay.

Accordingly, the invention relates to a system for transmission of telephony circuits in a packet switching network of the type comprising a plurality of switching nodes interconnected by connection lines and including intermediary switching nodes connected only to other switching nodes and end switching nodes each connected to at least an exchange telephone device, each switching node being associated to a control point in charge of controlling the exchange of voice signals carried out by switching packets in the network between two exchange telephone devices, the control points associated to the switching nodes being adapted to determine the best route between any source exchange telephone device and any destination exchange telephone device by identifying which of the connection lines are eligible based upon the requirement of a quality of service specified in terms of a maximum delay and a packet loss probability. In each end switching node of the network, a compressing/decompressing device comprises compressing means for receiving from a source exchange telephone device a sequence of uncompressed frames wherein each frame contains n slots containing each J bytes respectively associated to J voice circuits connecting the source exchange telephone device to a destination exchange device, compressing the data bits of each voice circuit in order to build a packet containing J compressed voice circuits, and providing this packet to the control point of the end switching node for transmission to the destination exchange telephone device over the best route, and decompressing means for getting from the control point of the end switching node a compressed packet containing J compressed voice circuits connecting the destination exchange telephone device to the source exchange telephone device, decompressing the data bits of each voice circuit in order to build a frame containing J byte of uncompressed bits respectively associated to the J voice circuits, and transmitting this frame within a sequence of frames to the source exchange telephone device.

BRIEF DESCRIPTION OF THE DRAWINGS

The above set forth and other objects and features of the invention will be clear in the following description of the best embodiment when read in reference to the accompanying drawings wherein.

DETAILED DESCRIPTION OF THE INVENTION

FIG. 1 and FIG. 2 relating to a conventional packet switching network have been described as background art of the present invention and will not be described again.

Figure 3:
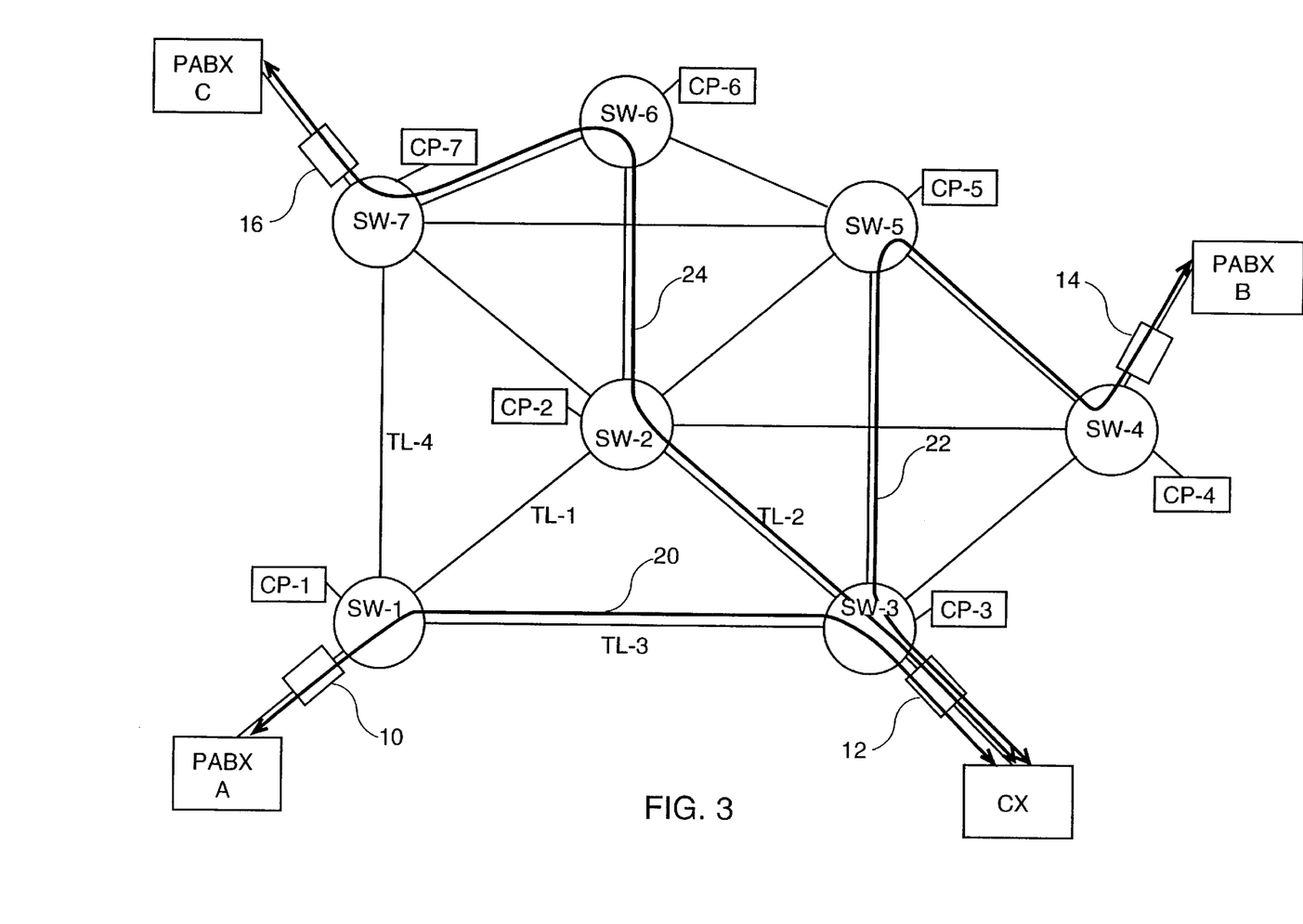
FIG. 3 is a schematic representation of the voice circuit connections in a packet switching network compression including decompression means according to the invention.

FIG. 3 represents a packet switching network of the type illustrated in FIG. 1 and FIG. 2 used as a transport network of voice circuits according to the invention. But, the end switching nodes are equipped with compression/decompression devices, such as switching nodes SW-1, SW-3, SW-4 and SW-7 which are equipped respectively with compression/decompression devices 10, 12, 14 and 16. Each of these end switching nodes is connected with an exchange telephone device which can be private exchange devices such as PABX A connected to switching node SW-1 by the intermediary of compression/decompression device 10, PABX B connected to switching node SW-4 by the intermediary of compression/decompression device 14 or PABX C connected to switching node SW-7 by the intermediary of compression/decompression device 16. The end exchange telephone device can also be a central exchange device such as CX connected to switching node SW-3 by the intermediary of compression/decompression device 12.

PABX's A,B and C are connected to the switching nodes of the network via E1 interfaces (or T1 in the USA or J1 in Japan). Central exchange CX, also connected to the network via E1 interfaces, is logically connected to all PABX's and is in charge of routing the phone calls. The connection 20 between CX and PABX A is through switching nodes SW-3 and SW-1; the connection 22 between CX and PABX B is through SW-3, SW-5 and SW-4; and the connection 24 between CX and PABX C is through SW-3, SW-2, SW-6 and SW-7. Though the example of FIG. 3 includes a single CX connected to a plurality of PABX's, the invention is also applicable when several CX's are interconnected.

The connections 20, 22 and 24 are set up as explained above. They are assigned a RT priority for scheduling at the different switches of the transport network. They are also established with a bandwidth reservation corresponding to the number of voice circuits transported in the connection. Usually, there are many connections (up to several hundreds) between PABX's and CX's in order to sustain peak hour call demands. It must be noted that connections 20, 22, 24 can be set up permanently, but they can also be set up at regular instants or when the number of new telephone calls is more than a predetermined threshold, by using the set up procedure as explained in the background.

In the embodiment implemented in the present description, the data are transmitted within frames on interfaces E1 between an exchange telephone device (PABX or CX) and the associated end switching node. Each frame is composed of slots wherein each slot contains 32 bytes, that is one synchronization byte, one signaling byte and 30 voice circuits which result in a bit rate of 64 Kbits/s×32=2.048 Mbits/s. Then, within the transport network, the synchronization byte is removed which would normally result in an aggregate bandwidth of 64 Kbits/s×31=1.984 Mbits/s. Such a high bit rate could not be used in a transport network including trunk line of the E1 type. The compression technique as explained below enables such trunk lines to be used. It must be noted that a number J of voice circuits different from 30 could be used.

Figure 4:
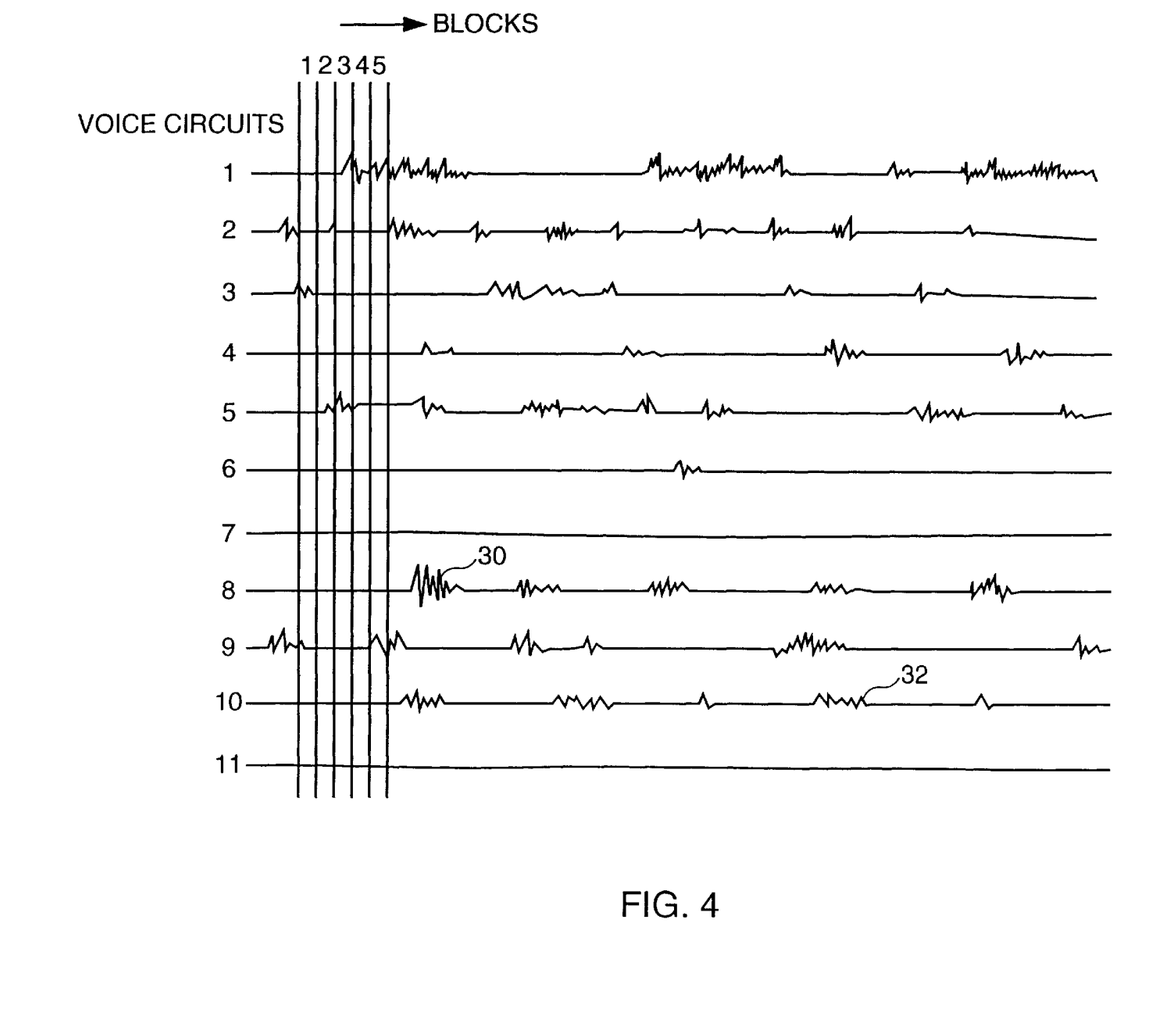
FIG. 4 represent diagrams of various voice signals which can be provided by exchange telephone devices in the packet switching network of FIG. 1.

FIG. 4 illustrated the principle of the compression technique of the invention.

Indeed, the variations of the signal amplitude on each of the voice circuits (only 11 voice circuits have been illustrated) are very different from one circuit to the other.

Some circuits such as circuits 7 or 11 are idle since they do not carry telephone calls. The proportion of idle circuits depends on the time of day. As explained below, their detection can be exploited to reduce the 1.984 kbits/s bandwidth reservation for the connection.

Active voice circuits exhibit silence and speech periods. Speech periods can be of large amplitude such as period 30 of circuit 8 or small amplitude such as period 32 of circuit 10. This amplitude variation can be exploited to reduce again the bandwidth reservation. The method is based upon the segmentation of each signal into small blocks illustrated in FIG. 4 as explained below.

Figure 5:
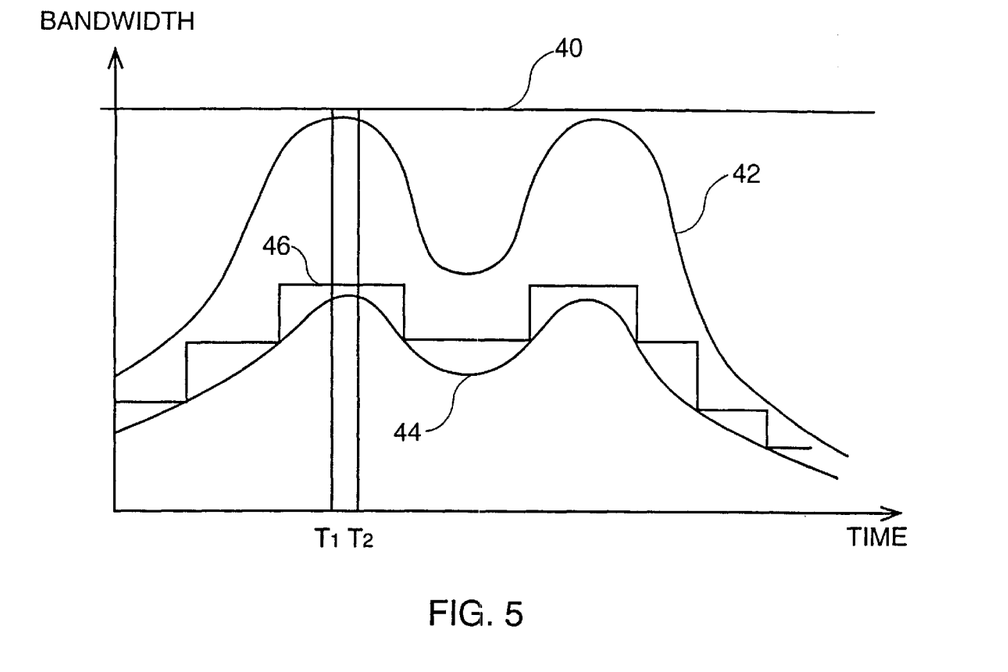
FIG. 5 is a time diagram representing the bandwidth of a connection between two exchange telephone devices.
Figure 6:
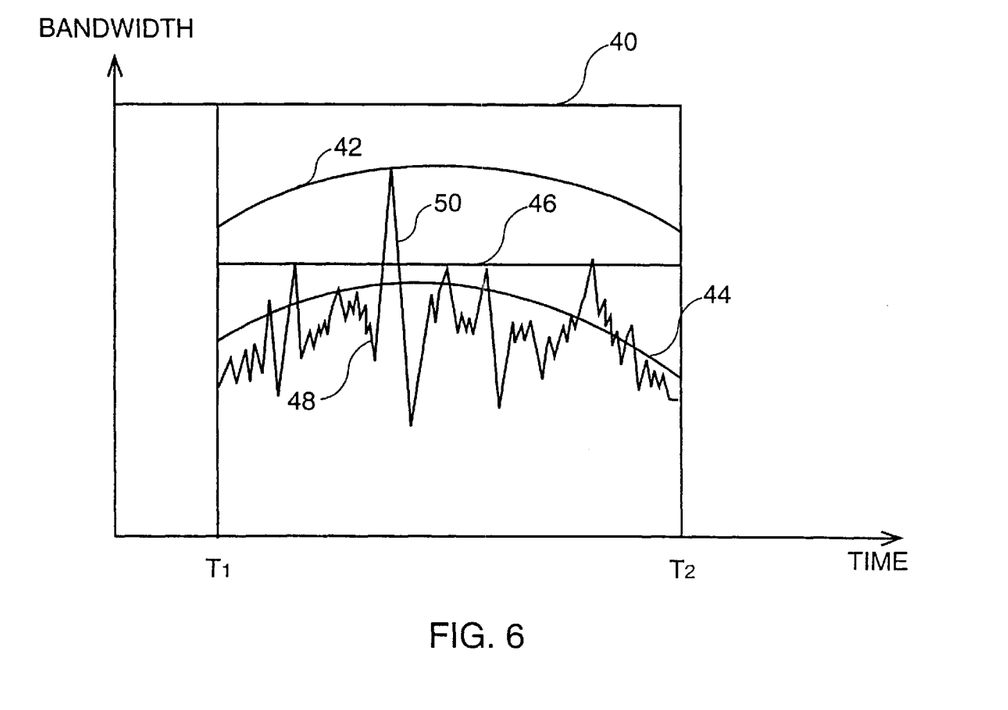
FIG. 6 is a detailed part of the time diagram illustrated in FIG. 5.

As explained in FIG. 5 and FIG. 6, the compression technique of the invention enables to strongly reduce the bandwidth. FIG. 5 shows various curves representing the bandwidth of a connection between two exchange telephone devices with respect to the time during a time interval spanning the all day:

curve 40 represents the peak hour bandwidth reserved for the connection in the prior technique, curve 42 represents the actual bandwidth (averaged) of the traffic at the input of the compression/decompression device of the end switching node, curve 44 represents the bandwidth (averaged) used in the transport network after compression by the compression/decompression device, curve 46 (stepwave) represents the bandwidth reserved for the connection according to the invention.

FIG. 6 shows a detailed view of FIG. 5 on a larger scale from T1 to T2 (a few seconds), wherein curve 48 illustrates the actual compressed traffic which is not averaged. Rather, this curve shows that the instantaneous per packet bandwidth can present important peaks such as peak 50.

Therefore, the invention has a main object to reduce the bandwidth utilization by compressing the data bits coming from the exchange telephone device, but also by removing important variations such as peak 50, in order to reduce the bandwidth utilization to the bandwidth curve 46.

Figure 7:
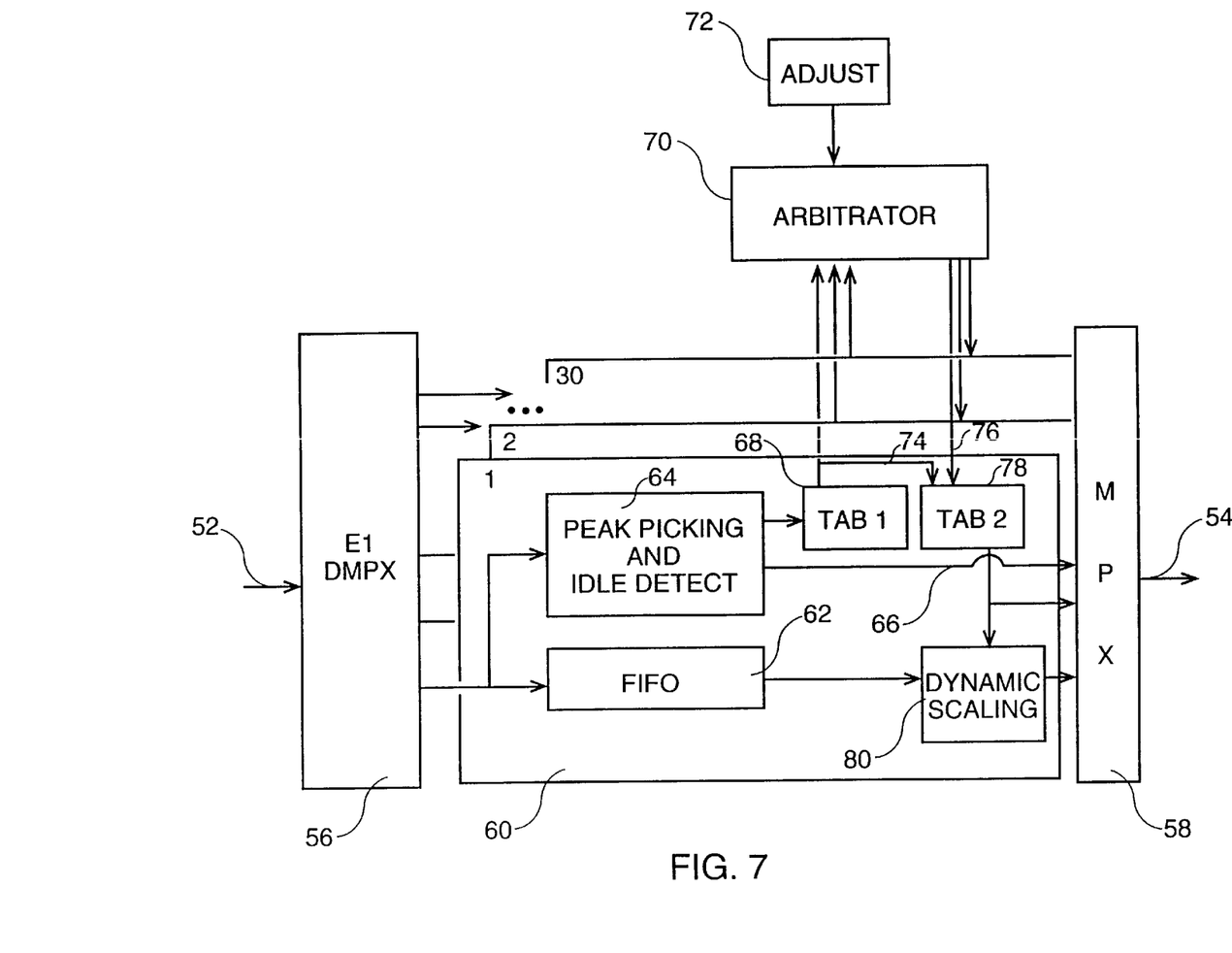
FIG. 7 represents the compressing device used in the preferred embodiment of the invention.

The operation of compression/decompression 10, 12, 14 and 16 are now described. FIG. 7 illustrates the compression unit of such a device which is adapted for receiving uncompressed frames on connection line 52 from PABX or CX, and transmitting decompressed packets to the transport network on connection line 54. The E1 demultiplexer 56 is clocked at 2.048 Mbits/s and receives one new slot of 32 bytes every 125 $\mu$s within a frame of 8 slots illustrated in FIG. 8. It must be noted that this number of 32 bytes could have been different since, as mentioned below, it depends on the bit rate allowed on the connection lines within the transport network. Also, the number of 8 slots has been chosen as an example in the description, but could be smaller to reduce the packetization delay or larger to reduce further the overhead.

Each slot is composed of

Figure 8:
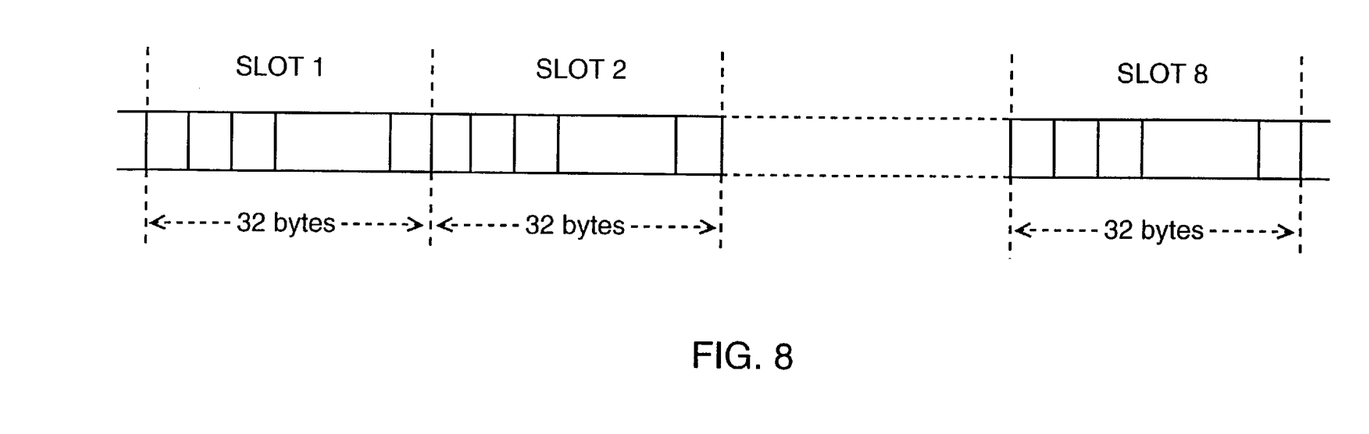
FIG. 8 is a schematic representation of a frame received by the end switching node from the source exchange telephone device.

Byte 0: synchronization character.

Bytes 1–15 and 17–31: they are 8 bit PCM samples encoded according to the A-law (in Europe) or to the $\mu$-law in the USA)m, and corresponding to the 30 voice circuits carried by the E1 interface.

Byte 16: signaling channel to carry the PABX to CX signalization.

Once the E1 demultiplexer 56 has synchronized on the synchronization character, it can demultiplex the signaling channel and the 30 voice circuits. For each slot, the signaling channel is directly sent to the multiplexer 58. Each voice circuit is processed independently by a processing unit such as unit 60 in FIG. 7 which performs the processing of voice circuit 1.

The PCM sample is first sent to a FIFO buffer 62 and to a peak picking and idle detect device 64. FIFO buffer 62 stores a block of 8 consecutive bytes corresponding to the ith byte of the 8 slots allocated to voice circuit j in FIG. 8. Device 64 searches for the peak value of these 8 bytes and eventually detects that the voice circuit has been idle for this block, according to the algorithm illustrated in FIG. 9.

Each voice sample x (i, j) wherein i=1, 2 . . . 8 (the 8 bytes of a processed frame) and j=1, 2 . . . 30 denoting one of the voice circuits, is formatted according to the A-law (or to the $\mu$-law) as follows:

x=[s x y z a b c d]

wherein bit 0=sign S (most significant bit)

bits 1, 2, 3,=segment x y z bits 4,5, 6, 7=linear code a b c d

Figure 9:
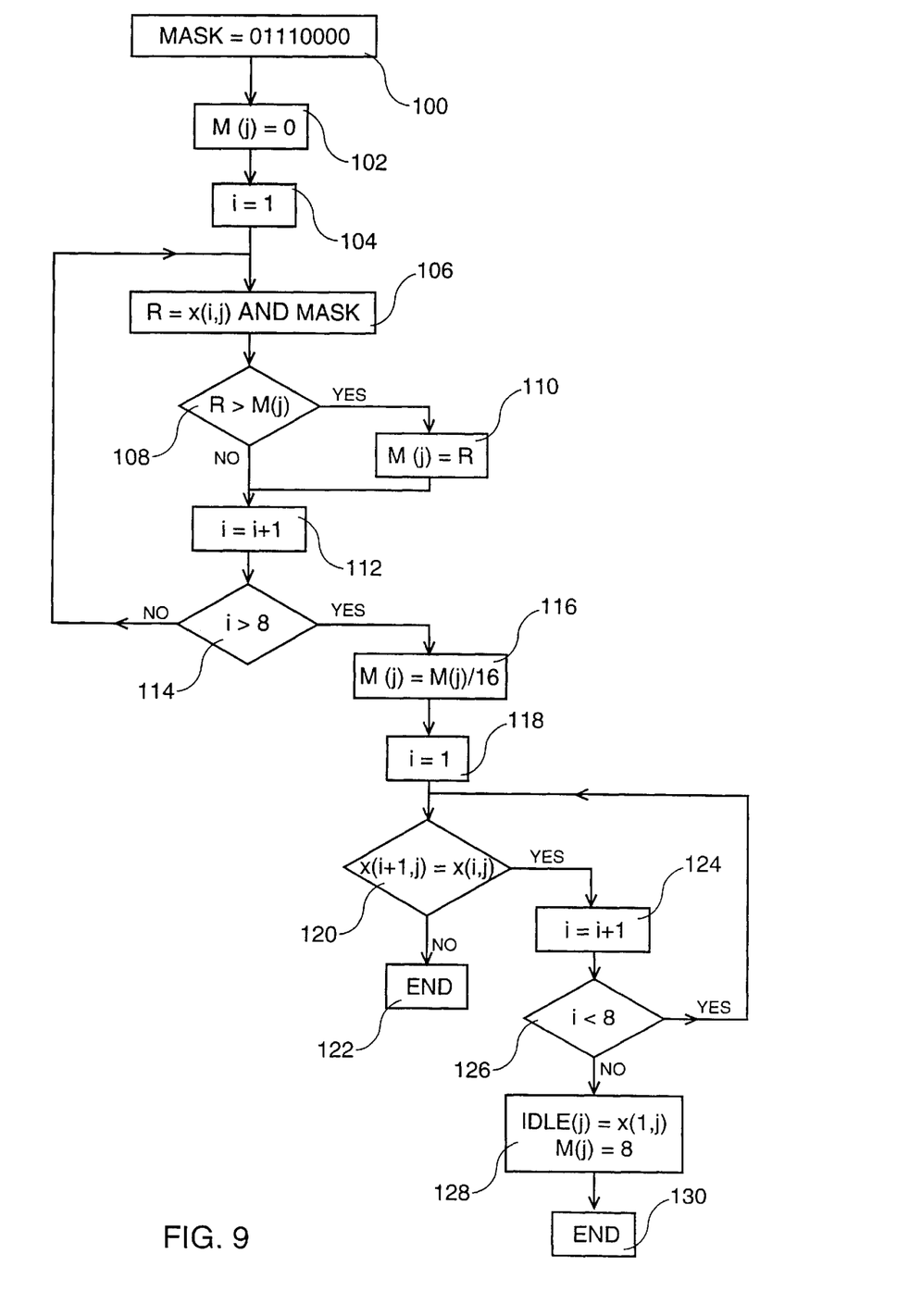
FIG. 9 is a flow diagram representing the algorithm used to compress data bits of the frame illustrated in FIG. 8.

The algorithm illustrated in FIG. 9 starts with the initialization (100) of a mask register MASK whose value is 01110000, the initialization (102) of the peak value M(j)=0 and the initialization (104) of the index i=1.

Then, an operation AND (106) is performed between x(i, j) and MASK, and the resulting value R is compared to M(j) (108). If R is greater than M(j), the value of M(j) is set to R (110). Then, index i is incremented (112). Then a test is performed (114) to determine whether i is greater than 8. If not the process is again performed with the new value of index i from AND operation between x(i,j) and MASK (106).

When the algorithm has been carried out for i=1 to 8, the peak value M(j) of the 8 bytes x(i, j) is obtained as being equal to the largest segment code in the block with values encoded within (0, 1, . . . 7). This peak value is divided by 16 (116) in order to eliminate the less significant bits equal to 0.

Then, the idle detection is implemented in the second part of the algorithm by initializing the value of i to 1 (118). A test is first performed (120) to check whether the sample being tested is equal to the next one. If not, the algorithm is ended (122) because the voice circuit is not detected as being "idle". If so, index is incremented (124) before being compared to 8 (126). If i is less than 8, the algorithm is again performed with the new value i. If not, this means that all samples for i=1 to 8 are identical and the block is declared idle by setting (128) a variable IDLE (j) to x(1, j) and setting M(j) to 8. Then, the algorithm is ended (130). It must be noted that, when the voice circuit is idle, the value of the sample x(i, j) is different from 0 in as much as a predefined pattern is generally transmitted by the exchange telephone device for an idle voice circuit.

Figure 10:
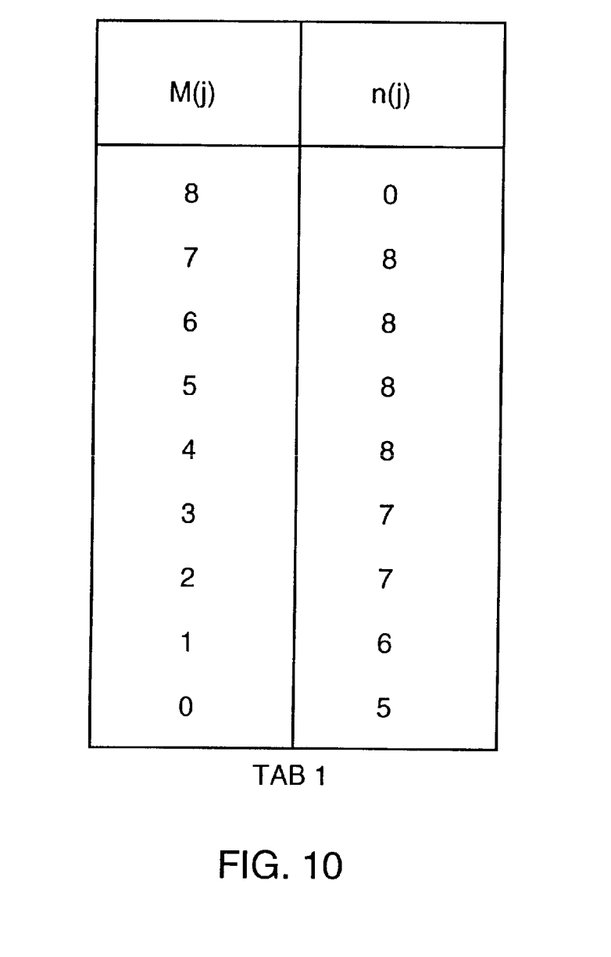
FIG. 10 is a table used to provide the theoretical compressed number of bits corresponding to each peak value of the voice circuit samples.

While the value of IDLE (j) is transmitted to multiplexer 58 on line 66, the value of M(j) determined as either the peak value of the samples or a value equal to 8 when the voice circuit is idle, is used to look up a table 68 (TAB 1) illustrated in FIG. 10. This table returns the number of bits n(j) to be used to encode voice circuit j, this number being determined according to the A-law.

All values n(j) for j=1 to 30 are sent, over line 74, to an arbitrator 70 the function of which is to make sure that, for every packet which will be transmitted by multiplexer 58 on the network, the number of bytes will correspond exactly to the bandwidth BR that has been reserved on the connection route. This bandwidth is set by an adjustment device 72 either with the help of a time of day table configured by the network operator or by means of a dynamic adjustment process.

Figure 11:
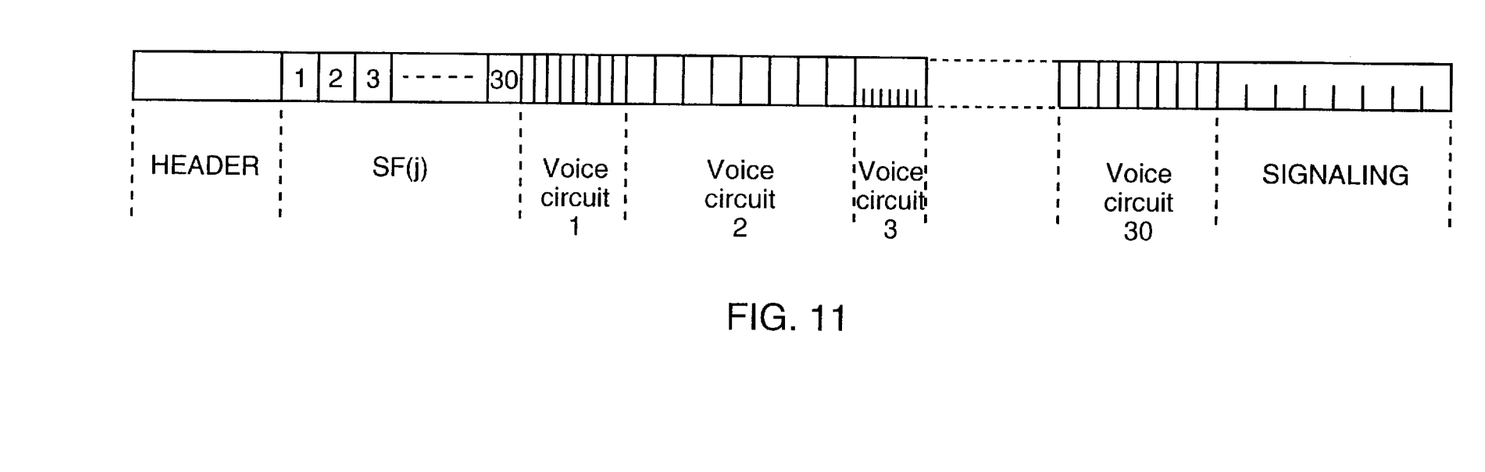
FIG. 11 is a schematic representation of a packet of compressed data bits to be transported over the packet switching network.

Before going further, it is useful to explain the contents of the packet to be transmitted over the transport network after compression in reference to FIG. 11. The packet starts with a header 6 bytes. After the header, the second part is composed of 30 fields of 4 bits representing each the scaling factor for each of the 30 voice circuits as explained later. Then, there are 30 slots, each slot corresponding to a block of 8 samples for each voice circuit, these slots having a variable length depending upon the data bit compression which has been carried out by running the algorithm of FIG. 9. It must be noted that, when the voice circuit is idle, only one byte of 8 bits is used such as voice circuit 3 in FIG. 11. Finally, the packet is ended with a signaling slot composed of 8 bytes of 8 bits each.

Accordingly, the number N of bits in the packet should be the sum of 8.n(j) for j=1 to 30 added with 232 bits corresponding to the packet overhead as follows:

Header: 6×8 bits=48 bits

Scaling Factors: 30×4 bits=120 bits

Signaling: 8×8 bits=64 bits

Figure 12:
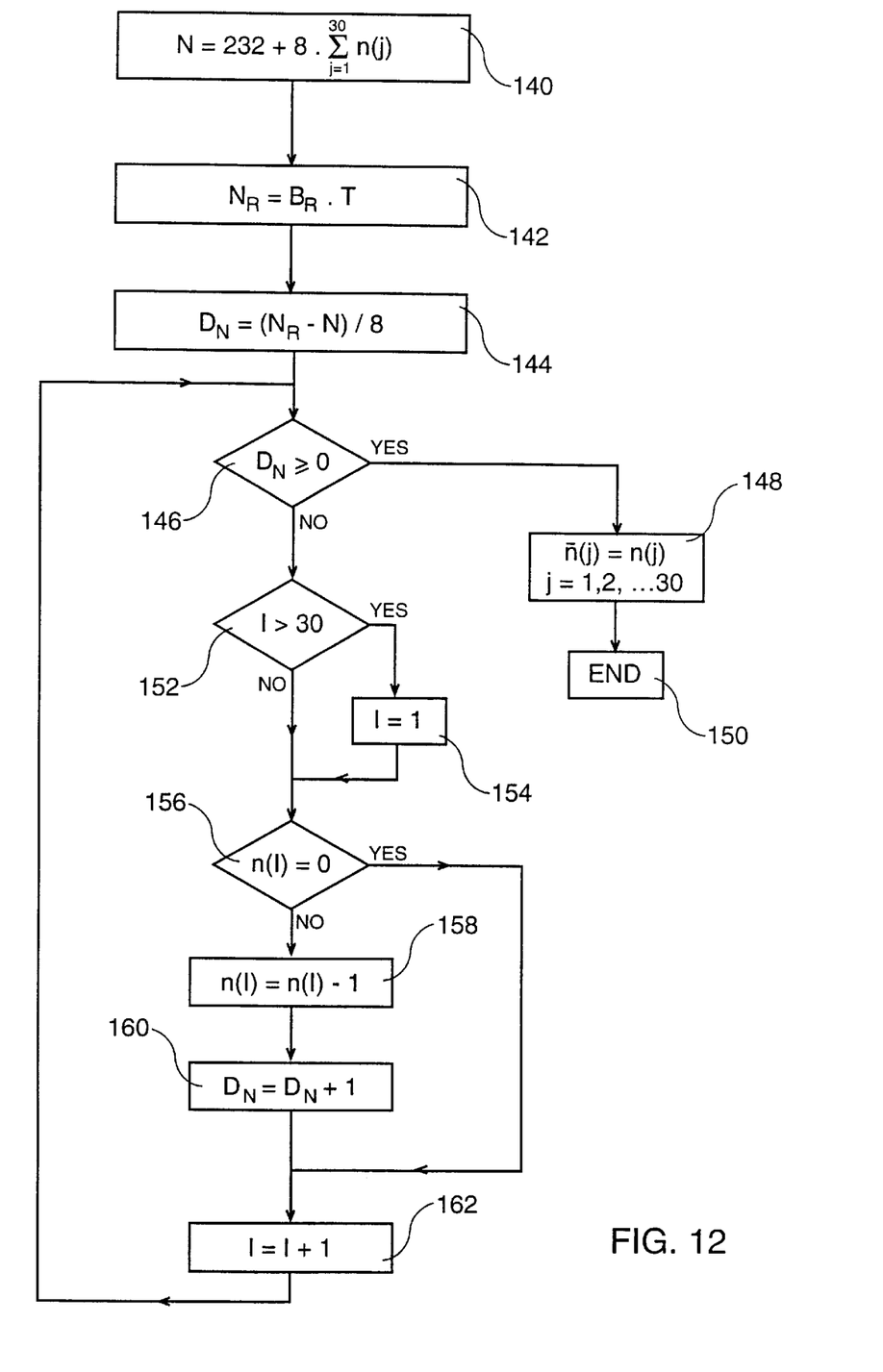
FIG. 12 is a flow diagram representing the algorithm used to reduce the theoretical compressed number of bits if the reserved bandwidth is not sufficient.

But, this number n(j) for each voice circuit can be reduced in view of the reserved bandwidth provided by adjust device 72 in FIG. 7. For this, the algorithm used by arbitrator 70 operates according to the flow diagram illustrated in FIG.

12. First the number N is determined (140) as explained above. The target number $N_R$ is computed by multiplying (142) the reserved bit rate $B_R$ in (bits/s) by the sampling period T of the packet (here T=8×25 μs=1 ms). Then, the difference is computed and scaled by 8 (144) to represent the number of bits to be eventually deleted from n(j). If $D_N \geq 0$ (146), the used bandwidth is less than the reserved bandwidth and the number of bits $\bar{n}(j)$ to be used is kept identical to the number n(j)(148), with j=1, 2 . . . 30. If so, the algorithm is ended (150).

If the difference $D_N$ between the target number of bits $N_R$ and the defined number N is less than 0, an index I (which was initially 1) is compared to number 30 of voice circuits (152). If I is greater than 30, it is reset to 1 (154). Then, the number of bits n(I) for voice circuit I is tested (156). If this number is not equal to 0, the number of bits n(I) for this voice circuit is dicremented (158) and $D_N$ is incremented (160). After this operation or if the number of bits n(I) is equal to 0, index I is incremented (162) and the algorithm is processed again for the next voice circuit.

It must be noted that, if the bandwidth $B_R$ has been correctly set, the number of bits N in every packet should be most of time less than the target number of bits $N_R$, which would provide a loss-less coding.

Figure 13:
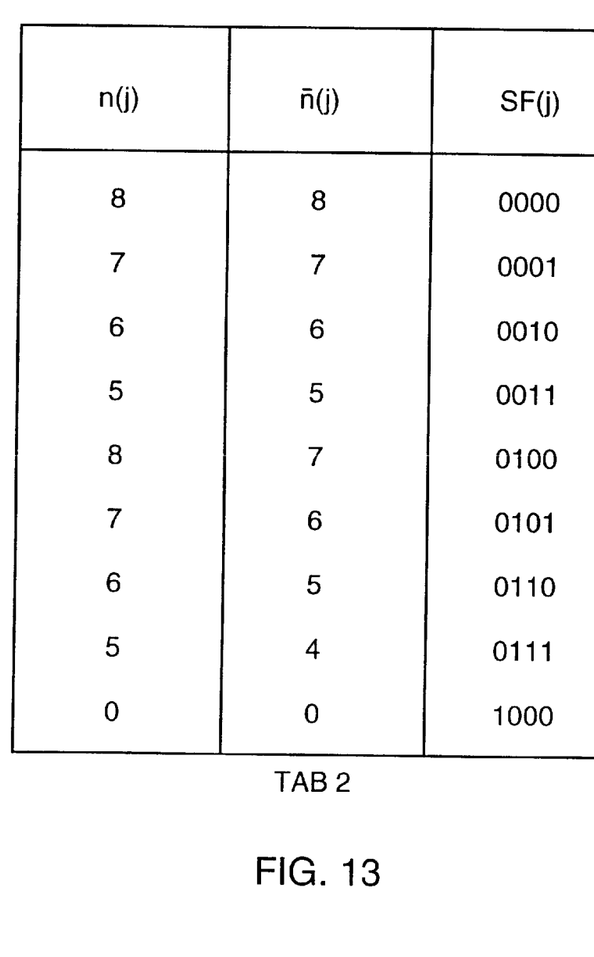
FIG. 13 is a table used to provide the scaling factors to be used in response to the theoretical and reduced numbers of compressed data bits.

When N exceeds $N_R$, the coding of some voice circuits is reduced by removing the least significant bit (LSB) to get a byte containing $\bar{n}(j)$ bits instead of n(j) bits. Both number n(j) supplied from TAB 1 on line 74 and number $\bar{n}(j)$ supplied from arbitrator 70 on line 76 are used as inputs to a table 78 (TAB 2) which provides a scaling factor SF (j) of circuit j as illustrated in FIG. 13. This scaling factor is used as input together with the bytes provided by FIFO 62, to a dynamic scaling unit 80. For each voice circuit j, unit 80 receives from FIFO 62, 8 voice samples x (i, j) encoded with the 8 following bits according to the A-law:

s x y z a b c d

Figure 14:
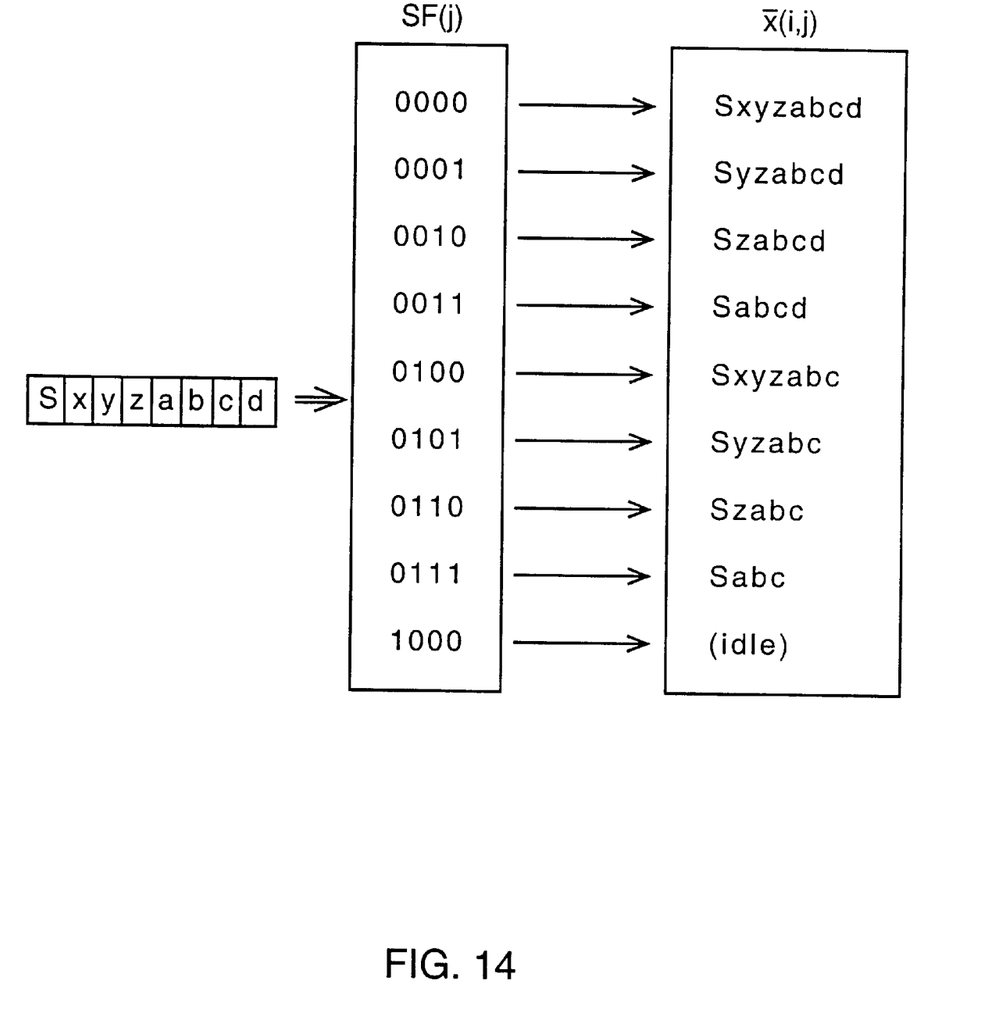
FIG. 14 represents the scaling table used to provide the compressed sample of voice circuit to each scaling factor.

By using the scaling factor SF(j), unit 80 scales these samples according to the table illustrated in FIG. 14. Such an operation can easily be implemented either using classical logic or using micro-instructions in a programmable computer.

Multiplexer 58 gathers the following information for each voice circuit j

Scaling factor SF(j)

compressed sample $\bar{x}(i, j)$ i=1,2 . . . 8 or IDLE(j) if the voice circuit is idle and builds the packet illustrated in FIG. 11, by adding to the sample data bits a 6 byte header and 8 signaling bytes further to the 30 fields of 4 bits corresponding to the SF(j)'s. Then, the packet is transmitted over the network on line 54.

Figure 15:
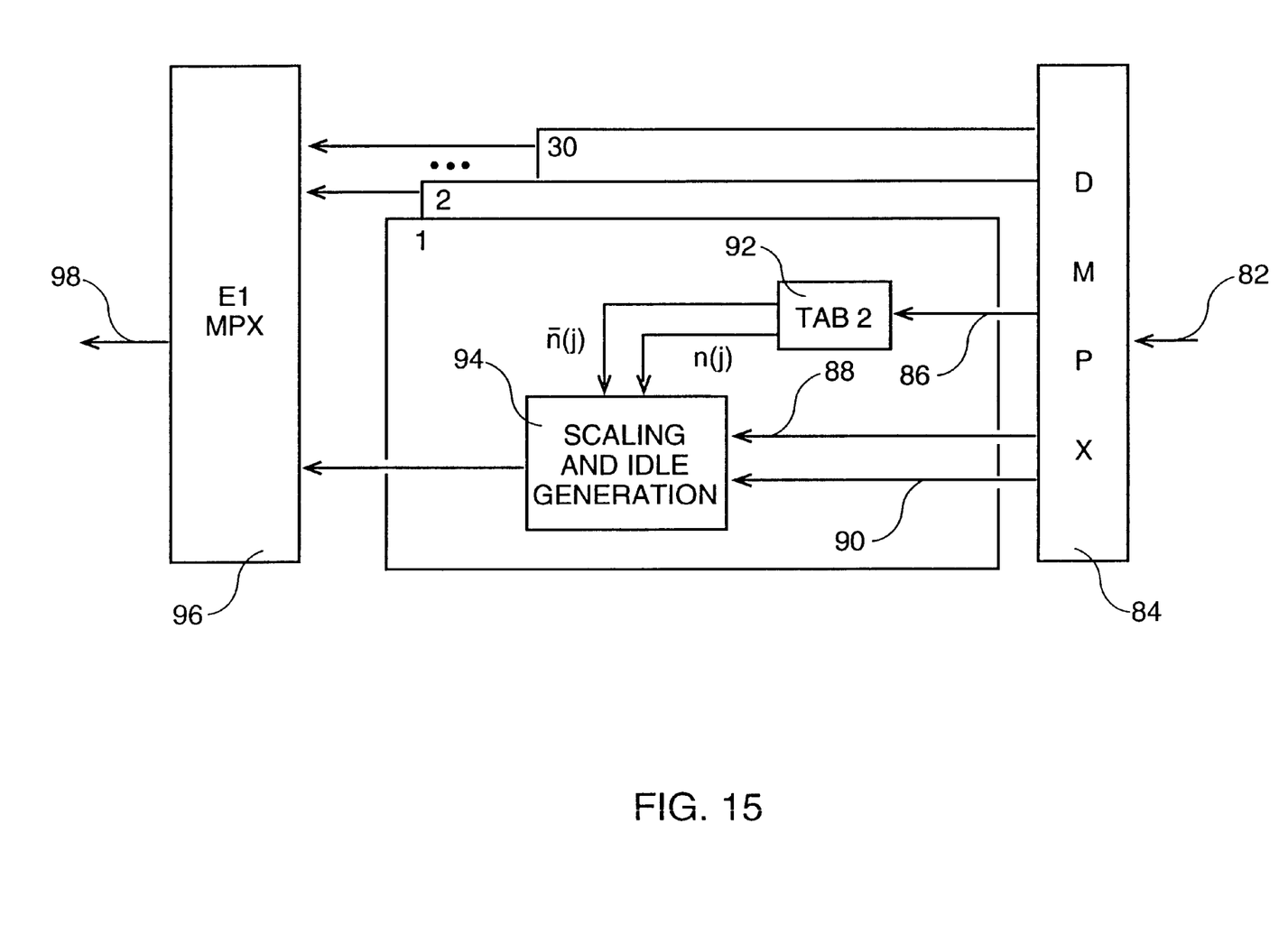
FIG. 15 represents the decompressing device used in the preferred embodiment of the invention.

When a packet transmitted over the transport network is received by the end switching node, it is decompressed by a decompression unit shown in FIG. 15. The packet is input on connection line 82 to a demultiplexer 84. This one extracts from the received packet for each voice circuit j the scaling factor SF(j) on line 86 byte IDLE(j) if any on line 88 compressed byte $\bar{x}(i, j)$ on line 90

Scaling factors are used as inputs to a table 92 which is identical to TAB 2 (see FIG. 13), to determine the values n(j) and $\bar{n}(j)$. These values together with $\bar{x}(i, j)$ from line 90, or IDLE(j) on line 88, are provided to the scaling and idle generation unit 94. Unit 94 implements the inverse operation of peak picking and idle detect unit in FIG. 7, that is providing uncompressed byte x(i, j) with i=1, 2 . . . 8 to E1 multiplexer 96 which performs the multiplexing of all bytes x(i, j) for j=1 to 30 in order to build a synchronized frame (illustrated in FIG. 8) to be transmitted to the exchange telephone device on connection line 98. It must be noted that, if scaling factor SF(j) is equal to 1000, scaling and idle generation unit 94 generates the idle character for each voice sample. Note also that the 8 signaling bytes are extracted by demultiplexer 84 and directly sent to multiplexer 96 for insertion in the synchronized frame (not shown in FIG. 15)

What is claimed is:

1. System for transmission of voice circuits in a packet switching network of the type comprising a plurality of switching nodes interconnected by connection lines and including intermediary switching nodes connected only to other switching nodes and end switching nodes each connected to at least an exchange telephone device, each switching node being associated to a control point in charge of controlling the exchange of voice signals carried out by switching packets in the network between two exchange telephone devices, the control points associated to said switching nodes being adapted to determine the best route between any source exchange telephone device and any destination exchange telephone device, said system being characterized in that each end switching node comprises a compressing/decompressing device including:

compressing means for receiving from a source exchange telephone device a sequence of uncompressed frames wherein each frame contains n slots containing each J bytes respectively associated to J voice circuits connecting said source exchange telephone device to a destination exchange device, compressing the data bits of each of said voice circuits in order to build a packet containing J compressed voice circuits, and providing said packet to the control point of said end switching node for transmission to said destination exchange telephone device on said best route; and decompressing means for getting from the control point of said end switching node a compressed packet containing J compressed voice circuits connecting said destination exchange telephone device to said source exchange telephone device, decompressing the data bits of each of said voice circuits in order to build a frame containing J bytes of uncompressed bits respectively associated to said J voice circuits, and transmitting said frame within a sequence of frames to said source exchange telephone device, wherein said compressing means comprise a voice circuit compressing unit for each of said J voice circuits, said voice circuit compression unit comprising:

peak picking and idle detect means for determining either that voice circuit j being compressed is not idle and then computing a peak value among said n slots, or that said voice circuit j is idle, and scaling means responsive to said peak picking and idle detect means for computing a scaling factor S(j) to be applied to each of said n slots in order to obtain the compressed voice circuit transmitted within said packet over the transport network.

2. System for transmission of voice circuits in a packet switching network of the type comprising a plurality of switching nodes interconnected by connection lines and including intermediary switching nodes connected only to other switching nodes and end switching nodes each connected to at least an exchange telephone device, each switching node being associated to a control point in charge of controlling the exchange of voice signals carried out by switching packets in the network between two exchange telephone devices, the control points associated to said switching nodes being adapted to determine the best route between any source exchange telephone device and any destination exchange telephone device by identifying which of said connection lines are eligible based upon the requirement of a plurality of service specified in terms of a maximum delay and a packet loss probability, said system being characterized in that each end switching node compresses a compressing/decompressing device including:

compressing means for receiving from a source exchange telephone device a sequence of uncompressed frames wherein each frame contains n slots containing each J bytes respectively associated to J voice circuits connecting said source exchange telephone device to a destination exchange device, compressing the data bits of each of said voice circuits in order to build a packet containing J compressed voice circuits, and providing said packet to the control point of said end switching node for transmission to said destination exchange telephone device on said best route; and decompressing means for getting from the control point of said end switching node a compressed packet containing J compressed voice circuits connecting said destination exchange telephone device to said source exchange telephone device, decompressing the data bits of each of said voice circuits in order to build a frame containing J bytes of uncompressed bits respectively associated to said J voice circuits, and transmitting said frame within a sequence of frames to said source exchange telephone device, wherein said compressing means comprise a voice circuit compressing unit for each of said J voice circuits, said voice circuit compression unit comprising:

peak picking and idle detect means for determining either that voice circuit j being compressed is not idle and then computing a peak value m(j) among said n slots, or that said voice circuit j is idle and providing an idle value IDLE(j), and scaling means responsive to said peak picking and idle detect means for determining the theoretical number n(j) of compressed bits to be contained in the compressed voice circuit j, computing the reduced number n(j) of compressed bits to be contained in said compressed voice circuit when the necessary bandwidth using said number n(j) is greater than the reserved bandwidth, and computing a scaling factor S(j) to be applied to each of said n slots in order to obtain the compressed voice circuit transmitted within said packet over the transport network.

3. System according to claim 2, wherein said packet includes a sequence of J fields containing each said scaling factor S(j) associated to said voice circuit j.

4. System according to said claim 2, wherein said scaling means comprise:

a first table providing said theoretical number n(j) of compressed bits for the voice circuit j in response to said peak value M(j) or to the idle status of said voice circuit; and a second table providing said scaling factor SF(j) for said voice circuit j in response to said theoretical number n(j) and said reduced number n(j) of compressed bits for said voice circuit j.

5. System according to claim 4, wherein said scaling means comprise arbitrator means for computing said reduced number n(j) of compressed bits for said voice circuit j from said theoretical number n(j) provided from said first table and in response to adjust means providing either the value of the reserved bandwidth depending upon the time of day or the value of an adjusted dynamic bandwidth.

6. System according to claim 2, wherein said decompressing means comprise a voice circuit decompressing unit for each of said voice circuit, said voice circuit decompressing unit comprising a third table for providing from said scaling factor of said voice circuit j said theoretical number n(j) and said reduced number n(j) of compressed bits for said voice circuit j, and scaling and idle generation means for providing in response to both said theoretical number n(j) and said reduced number n(j) an uncompressed voice circuit to be transported in each slot of said frame transmitted to said source exchange telephone device, said uncompressed voice circuit being computed from the compressed voice circuit within said packet received by said end switching node or from said idle value IDLE(j) when said voice circuit is idle.

7. Process for transmitting compressed voice circuits over a packet switching network of the type comprising a plurality of switching nodes interconnected by connection lines and including intermediary switching nodes connected only to other switching nodes and end switching nodes each connected to at least an exchange telephone device, each switching node being associated to a control point in charge of controlling the exchange of voice signals carried out by switching packets in the network between two exchange telephone devices, the control points associated to said switching nodes being adapted to determine the best route between any source exchange telephone device and any destination exchange telephone device by identifying which of said connection lines are eligible based upon the requirement of a quality of service specified in terms of a maximum delay and a packet loss probability, said process being characterized in that it comprises the steps of:

receiving from a source exchange telephone device a sequence of uncompressed frames wherein each frame contains n slots containing each J bytes respectively associated to J voice circuits connecting said source exchange telephone device to a destination exchange device;

determining either that a voice circuit j to be compressed is not idle and computing a peak value among said n slots, or that said voice circuit j is idle;

responsive to said determining step, computing a scaling factor S(j) for each of said n slots;

compressing the data bits of each of said voice circuits using the corresponding scaling factor S(j) in order to build a packet containing J compressed voice circuits; and providing said packet to the control point of said end switching node for transmission to said destination exchange telephone device on said best route.

8. Process for transmitting compressed voice circuits over a packet switching network of the type comprising a plurality of switching nodes interconnected by connection lines and including intermediary switching nodes connected only to other switching nodes and end switching nodes each connected to at least an exchange telephone device, each switching node being associated to a control point in charge of controlling the exchange of voice signals carried out by switching packets in the network between two exchange telephone devices, the control points associated to said switching nodes being adapted to determine the best route between any source exchange telephone device and any destination exchange telephone device by identifying which of said connection lines are eligible based upon the requirement of a quality of service specified in terms of a maximum delay and a packet loss probability, said process being characterized in that it comprises the steps of receiving from a source exchange telephone device a sequence of uncompressed frames wherein each frame contains n slots containing each J bytes respectively associated to J voice circuits connecting said source exchange telephone device to a destination exchange device, compressing the data bits of each of said voice circuits in order to build a packet containing J compressed voice circuits, and providing said packet to the control point of said end switching node for transmission to said destination exchange telephone device on said best route, wherein said step of compressing the data bits of each voice circuit comprises a voice circuit comprising unit for each of said J voice circuits, said voice circuit compression unit comprising:

computing, if voice circuit j being compressed is not idle, the peak value M(j) among said n slots, or providing an idle value IDLE(j) if said voice circuit j is idle;

determining the theoretical number n(j) of compressed bits to be contained in the compressed voice circuit j;

computing the reduced number n(j) of compressed bits to be contained in said compressed voice circuit when the necessary bandwidth using said number n(j) is greater than the reserved bandwidth; and computing a scaling factor S(j) to be applied to each of said n slots in order to obtain the compressed voice circuit transmitted within said packet over the transport network.

* * * * *